United States Patent [19]

Wagar et al.

[11] Patent Number: 5,678,024
[45] Date of Patent: Oct. 14, 1997

[54] METHOD AND SYSTEM FOR DYNAMIC PERFORMANCE RESOURCE MANAGEMENT WITHIN A COMPUTER BASED SYSTEM

[75] Inventors: Bruce Alan Wagar, Los Banos; Andrew Paul Gellai, San Jose; Janice K. Mead, Cupertino, all of Calif.

[73] Assignee: International Business Machines Corporation, Armonk, N.Y.

[21] Appl. No.: 438,136

[22] Filed: May 8, 1995

[51] Int. Cl.⁶ .................................................. G06F 12/08
[52] U.S. Cl. .................... 395/456; 395/726; 395/479; 364/967.4
[58] Field of Search .................. 395/650, 425, 395/725, 456, 726, 479; 364/967.4

[56] References Cited

U.S. PATENT DOCUMENTS

| | | | |
|---|---|---|---|
| 4,325,120 | 4/1982 | Colley et al. | 364/200 |
| 4,574,350 | 3/1986 | Starr | 364/200 |
| 4,787,026 | 11/1988 | Barnes et al. | 364/200 |
| 5,117,350 | 5/1992 | Parrish et al. | 395/425 |
| 5,148,530 | 9/1992 | Joyce et al. | 395/375 |
| 5,175,679 | 12/1992 | Allen et al. | 364/148 |
| 5,285,528 | 2/1994 | Hart | 395/725 |
| 5,357,623 | 10/1994 | Megory-Cohen | 395/425 |

*Primary Examiner*—Kevin A. Kriess
*Assistant Examiner*—Majid A. Banankhah
*Attorney, Agent, or Firm*—Benman Collins & Sawyer; Esther Klein

[57] ABSTRACT

A method and system in accordance with the present invention overcomes the problem of program applications causing an overcommitment of a performance resource, while permitting full use of the performance resource by multiple concurrent applications. In such a method and system each program whose applications need access to a specific performance resource subscribe to a particular protocol to dynamically manage the available performance resource. This permits full use of the performance resource by all of the applications in the system without risk of overcommitting all the performance resource.

19 Claims, 3 Drawing Sheets

METHOD AND SYSTEM FOR DYNAMIC PERFORMANCE RESOURCE MANAGEMENT WITHIN A COMPUTER BASED SYSTEM

FIELD OF THE INVENTION

The present invention relates generally to a computer based system, and more particularly to managing a performance resource in a computer based system.

BACKGROUND OF THE INVENTION

In many computing systems, resources are provided whose main purpose is to improve the performance of selected program applications and the entire system. These resources can be either special purpose (such as processors dedicated to a single task, like sorting), or superfluous (such as extra processor memory, to allow program applications to keep more of their code and data off of disk memory). These resources will be henceforth referred to as "performance resources".

Accordingly, throughout this specification, the term "program" refers to a software program that runs on the computing system, while "program application," or "application", for short, refers to a single instantiation of a software program. A program can have numerous applications of itself processing at the same time (that is, the computing systems are capable of multiprogramming).

A performance resource is characterized by several properties:

(a) It improves performance.

When dedicated to a particular application, the performance resource improves the performance of that application, and possibly the performance of the whole system.

(b) It is quantifiable.

The performance resource can be broken up into one or more pieces and assigned to different applications as the operating system sees fit.

(c) It is optional.

Applications can run without the performance resource.

(d) It can be virtualized.

The operating system can provide a way for one or more applications to appear to have exclusive access to more of the performance resource than exists on the system. Not every application is likely to use all of the performance resource to which it thinks it has exclusive access. When there is more demand for the performance resource than the system has performance resource to provide, the system has to make a trade-off, such as:

Substitute a less efficient alternative resource in place of the performance resource. The use of the alternative resource would be transparent to the applications, though they and the whole system might suffer significant performance degradation.

Suspend one or more applications using the performance resource, until enough of the performance resource frees up. While this may improve system performance, it can be devastating to the performance of the suspended applications.

A performance resource can become overcommitted by one or more applications that place more of a demand on the performance resource than there is performance resource to satisfy the demand. At this point, the performance resource may cease to provide any performance improvement. In fact, performance degradation may take place if part of the demand is off-loaded to a less efficient backup resource, or if some of the applications are temporarily suspended until demand subsides.

Specialized Sort Processor

For example, on a typical system there may be a processor dedicated to a special function, like sorting. When a sorting application is sent to the special processor, the sorting performance improves, as does the system's performance, since the main processor no longer has to do the sort processing. Suppose further that even two sorting applications can be sent to the same specialized processor with improved sort hand system performance, but that when more than two sorting applications are assigned, overall sort and system performance degrades. The specialized processor, in this case, would be an example of a performance resource.

External Sorting/Expanded Storage

One problem associated with the utilization of a performance resource is related to external sorting and expanded storage. External sorting deals with the problem of rearranging a large number of records (that is, more records than can fit in the available main processor memory) via some ordering described by a particular portion of each record. External sorting typically comprises:

(a) String Creation

Processing a portion of the input data at a time, forming disjoint "strings" (sorted subsequences of records), and writing the strings onto some external medium (typically disk or tape).

(b) Merge

Reading back portions from each of several strings, merging the data into a longer string, and repeating the process until only one string remains. Internal and External Sorting Traditionally, sort methods are classified into internal methods and external methods. An "internal method" is one that can be applied with acceptable performance only to those lists of data that can be completely contained within the primary storage of the processor. An "external method" is one that reasonably applies to files of data that are too large to fit into the primary store and must therefore rely on external bulk storage devices, such as tape or DASD, during the sorting process.

Most "external sorting" methods make a first pass through the file to be sorted, breaking it up into blocks about the size of internal memory, sorting these blocks using any one of a number of internal sorting methods, and then writing the results to the "work device". A merge is then performed upon the sorted blocks together by making several passes through the file and creating successively larger sorted blocks until the whole file is sorted. Typically, replacement selection is used for the merging of multiple ordered strings into longer strings. This is described by Knuth, "Search and Sorting", The Art of Computer Programming, Vol. 3, copyright 1973 by Addison-Wesley Publishing Co., pp. 251–266.

Quantitatively in an external sort, if there is an unordered list of n keys and an internal memory capacity of m<n words, then each sort pass produces n/m sorted blocks. If a p-way merge is performed on each subsequent pass, then $$\log_p (n/m)$$

passes may be required.

Prior Art External Storage in Primary Store

Barsamian, U.S. Pat. No. 3,713,107, "Firmware Sort Processor System", issued Jan. 23, 1973, resorts to multiple overlapped processor architecture using main memory as a sort buffer. More particularly, Barsamian uses an external sort processor (30) bus coupled to and overlapped with a host CPU (20) to increase throughput (see col. 3, lines 59–64; col. 19, line 37, to col. 22, line 30; and FIGS. 3 and 5). Case et al., "Cache-effective Sort String Generation Method", application Ser. No. 06/796,034, filed Nov. 7, 1985, teach the new use of an LRU-managed cache portion of CPU main memory for performing the internal sort and merge operations of an external sort. This result occurs by constraining the size of each sort and merge subset to be less than that cache size which would trigger the cache LRU paging action.

Sorting in Virtual Storage

Sedgewick, "Algorithms", Second Edition, copyright 1983, 1988 by Addison-Wesley Publishing Co., page 187, points out that "a large virtual memory capability should not be overlooked in a method for sorting very large files". He then teaches away therefrom by pointing out several sort methods which would not succeed in a VM sort environment such as Quicksort and Radix sort.

Lorin, "Sorting and Sort Systems", copyright 1975 by Addison-Wesley Publishing Co., pp. 329–347, and especially pp. 334–339 and 343–345, points out that:

"... the concept of virtual memory suggests that it would be possible to order a larger population of files using strictly internal sort techniques. As the concepts of the transparency of real performance resource and logical performance resource advance, it might be possible to conduct all sorting in this way. However, since the behavior of virtual memory overlays varies, the sort technologist must discover what internal sorts are appropriate for ordering of files in virtual memory."

Expanded Storage

External sorting performance can be improved through use of a high-speed medium for some, or all, of the strings. On IBM systems, "expanded storage" (a slightly less efficient form of main processor memory, and is only accessible in 4096-byte portions) can be used to store some or all of the strings, in place of much slower disk memory.

For the MVS operating system, expanded storage is accessible to programs via a software structure known as a hiperspace. A hiperspace can be almost any size; MVS attempts to store the actively used portion in expanded storage.

When more data is stored in hiperspaces than there is available expanded storage, the excess data is stored in "auxiliary storage." Auxiliary storage is disk memory that is written to in 4096-byte portions. The performance (especially random access) of auxiliary storage is considerably worse than that of expanded storage. In fact, it is often worse for an application to access hiperspace data that is stored in auxiliary storage than it is for the application to access data directly on disk memory.

To help programs decide how much use their applications can make of hiperspaces without risk of the data being stored in auxiliary storage, MVS makes available a service called storage test (STGTEST). STGTEST provides, at any given instant, the amount of expanded storage that is not in use as well as the amount of expanded storage that has not been used recently.

Even with STGTEST, however, programs like external sorting are never guaranteed that their hiperspace data will be stored entirely in expanded storage. When multiple concurrent large hiperspace sorting applications are started in a system, expanded storage can become overcommitted. This is because the sorts' hiperspace sizes are chosen based on the availability of expanded storage at the start of the sorts, without knowledge of other large sorts in the system that will place large demands on expanded storage at the same time.

This overcommitment leads to shortages of expanded and auxiliary storage, as well as external sorting and system performance degradation. What is needed therefore is a system and method that reduces overcommitment of a performance resource in a computing environment. What is also needed is a system and method for allowing an application which utilizes the performance resources to be able to directly access information without utilizing the performance resource when the performance resource is overutilized. The present invention addresses such a need.

SUMMARY OF THE INVENTION

A method and system for utilizing a performance resource by a plurality of applications in a computer based system in accordance with the present invention is disclosed. In a first aspect the method and system comprises identifying the performance resource to be utilized; determining how much of the performance resource is available; and dividing the available performance resource into partitions. The method and system also includes assigning each of the partitions a unique identification; and determining how many partitions of the available performance resource can be utilized by the application. In so doing, the performance resource can be utilized effectively by several applications.

In another aspect, the method and system also issues locks on desired partitions; and determines if the desired partitions can be obtained. If not enough of the desired partitions can be obtained then any unnecessary partitions already obtained are released. If enough of the desired partitions can be obtained, then the applications is run utilizing the available performance resource. Through the system and method in accordance with the present invention, a performance resource, such as expanded storage or a specialized or dedicated processor, can be optimally utilized by several applications running on the same system as long as their corresponding programs have a common protocol.

DESCRIPTION OF THE INVENTION

The present invention relates to an improvement in a sorting system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
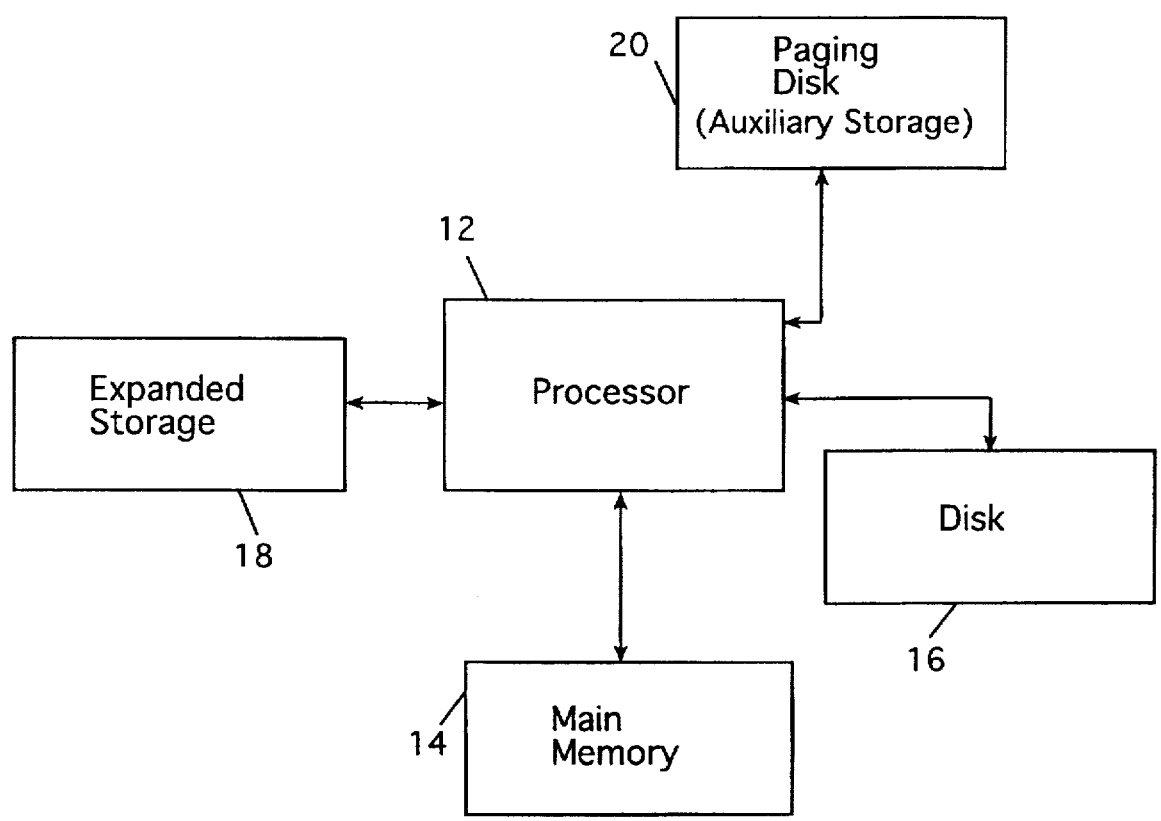
FIG. 1 is a block diagram of a processing system.

To more particularly describe an embodiment of the present invention, refer now to FIG. 1. FIG. 1 is a block diagram of a processing system 10. The processing system comprises a processor 12 which typically can access main memory 14, a disk 16, and an expanded storage area 18. The processor 12 also includes its own paging disk 20. In this embodiment, the expanded storage memory is the performance resource. However, it should be readily understood by one of ordinary skill in the art that the performance resource can be any type of performance resource that satisfies the above-identified criteria.

Because memory costs increase dramatically with speed, many computer systems divide the physical memory subsystem into a number of performance levels. Some of these levels, such as DASD and tape, have been treated as peripheral I/O devices and are accessed over an asynchronous path. Other levels, such as RAM and cache, have been treated directly by system hardware and are accessed over a synchronous path as part of internal memory.

The term "primary storage" or "internal storage" specifies that portion of memory randomly addressable for single read or write transfers. In IBM systems, RAM is byte addressable. "Secondary" or "external storage" refers to that portion of memory/storage that is not randomly addressable and is either directly accessed or must be accessed in fixed-size blocks.

Primary or internal store is termed "synchronous" in that a processor referencing said internal store will idle until a return is received; whereas, if the data being sought resides in external store (beyond a point called the "I/O boundary"), a referencing processor will search for another task to perform instead of waiting. This task or process switching is disruptive in that a retrieval path must be established to the new data and the processing state of the prior task must be saved. When the retrieval from external storage has been completed, it is again necessary to switch the CPU back to the former process or task.

It was desired to minimize the paging or fixed-size block references beyond the I/O boundary to reduce CPU overhead by incorporating additional memory as part of the primary store. The added memory, termed "expanded store", is randomly accessed on a block or page addressable (4096 bytes/block) basis. It is managed as an LRU real memory backed paging store.

Demand Paging Virtual Storage

"Virtual Storage" is the addressing of a storage space much larger than that available in the primary or internal memory of a CPU. It relies on locality of referencing in both space and time. That is, processes tend to reference storage in nonuniform, highly localized patterns. This makes it possible for a small amount of real memory to back a much larger amount of virtual storage. If the referenced data is not available in internal storage, then it is swapped in from secondary storage.

In a virtual demand paging system, each process actively references some subset of its virtual pages. The capacity of the system to manage pages is measured in terms of an upper bound on the number of slots or "page frames". That is, the number of page frames is related to the amount of primary store set aside to support the page frames. If the sum of the subsets of pages referenced by processes exceeds the number of page frames, then faulting will occur. "Faulting" is a synonym for the requirement to access secondary storage since the referenced page was not resident in the LRU-managed primary store. A system in this state is said to be "paging." Paging and Thrashing When a CPU runs several processes concurrently (multiprogramming or multitasking), each process may make repeated calls to its "working set" of pages. For a fixed size of internal (real) store, the number of pages per process resident in primary store varies inversely with the number of processes. This makes it possible for every process to keep sufficient pages in primary store to avoid generating a large number of page faults. Thus, there is a critical relationship between the amount of primary (real) memory and the degree of multiprogramming. This means that beyond a threshold, the path between the secondary and primary stores becomes saturated, many processes await page transfers, and the CPU is underutilized or starved. In this regard, "thrashing" is the term used to connote a high repaging rate and is an index of the tendency of a CPU-based page replacement manager to incorrectly guess the future referencing occurrences in a demand paging virtual store.

A method and system in accordance with the present invention overcomes the problem of application programs causing an overcommitment of a performance resource, while permitting full use of the performance resource by multiple concurrent applications of the programs. In such a method and system each application program whose applications need access to a specific performance resource subscribe to a particular protocol. A system in accordance with the present invention optimizes the use of such a performance resource in the system.

While performance resource management is usually the responsibility of the operating system, it is often the case that the programs are in a better position to manage the performance resource needs (current and future) of their applications. By using locks and partitioning the available performance resource, the assignment of these partitions can be dynamically managed by the individual applications. This allows the applications to make full use of the performance resource (such as expanded storage) and eliminates the risk of overcommitment of the performance resource.

This idea can be extended to a variety of programs whose applications need their hiperspace data to be stored in expanded storage. It can also be extended to other performance resources whose effect on system performance becomes negative when too much concurrent demand is placed on them. Other examples include data spaces (similar to hiperspaces, but whose data is stored in main memory when possible) and control spaces (which causes applications to obtain exclusive use to large amounts of main memory).

Referring back to the previously described specialized processor example, a sort program could apply the invention to this situation by deciding on two names, SORT1 and SORT2, by which access to the dedicated processor could be controlled. When an application of the sort program starts, it has to get a lock on either SORT1 or SORT2, and if successful, the sorting application can use the dedicated processor. Otherwise, the sorting application would instruct the operating system not to place it on the dedicated processor. Any sorting application that obtained a lock would release it when it was done sorting.

Figure 2:
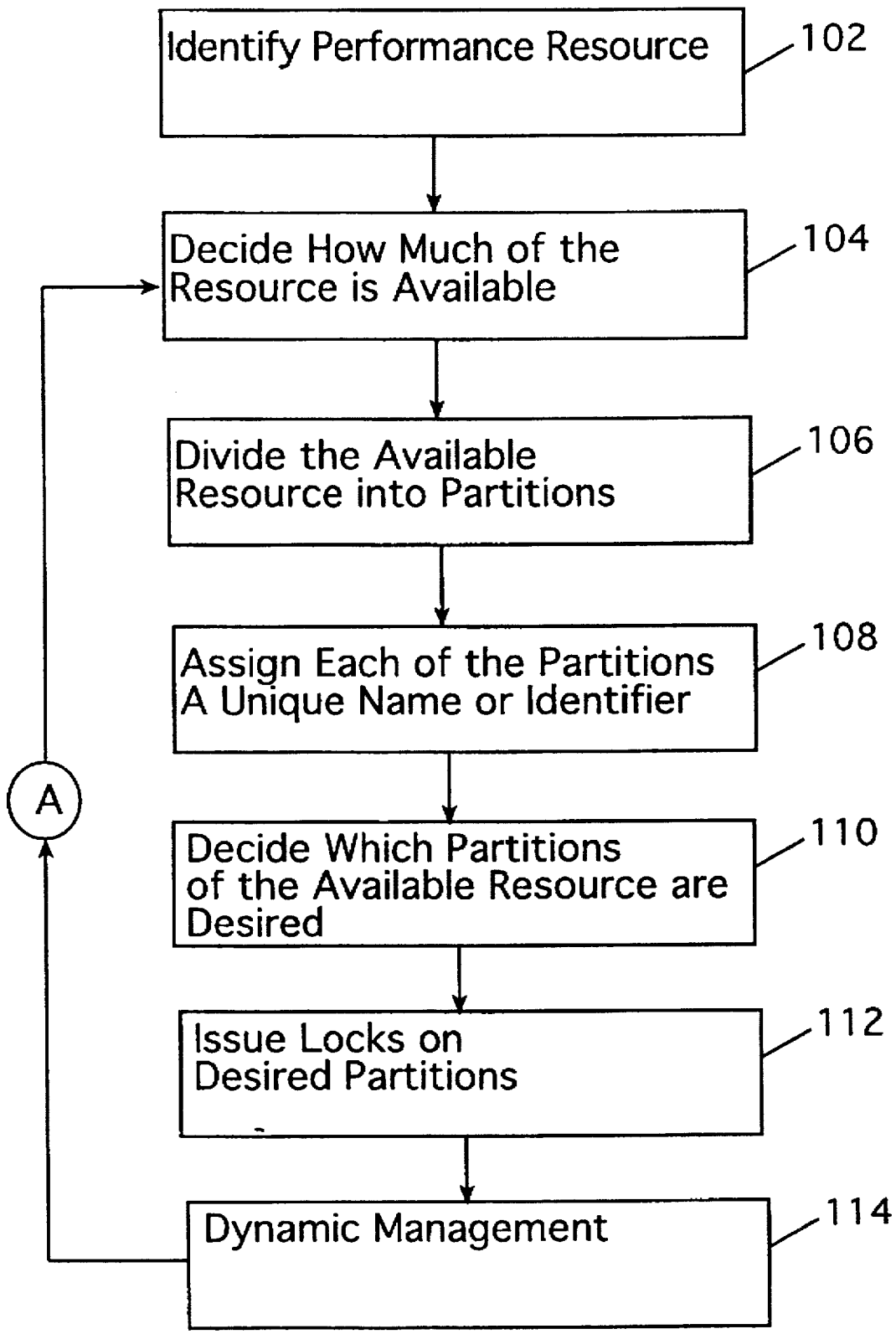
FIG. 2 is a flow chart of the operation of a performance resource manager system in accordance with the present invention.

To more specifically describe the present invention, refer now to FIG. 2, which is a flow chart of the operation of a performance resource management system in accordance with the present invention.

Initially, a performance resource is identified via step 102. Next, a decision is made as to how much of the performance resource is available for use in the system via step 104. That is, the amount of performance resource available which provides the most overall performance improvement when compared to not using any of the performance resource.

Next, the available performance resource, is broken into disjoint partitions via step 106. Partitions do not have to be uniform size, nor even fixed size, provided every application whose program subscribes to this management partitions the available performance resource in the same manner.

Thereafter each of the partitions is assigned to a unique identifier or name via step 108. Again, every application whose program subscribes to this management assigns the same name or identifier to the same partition.

Next, it is determined which (or how many) partitions of this resource are desired, via step 110. In one embodiment, a decision is made about how much of the performance resource can be utilized; both minimum and maximum amounts, and the results are converted to a corresponding set of partitions.

Next, it is determined how many partitions can be utilized, through use of locks on the corresponding names of the desired partitions, via step 112. In one embodiment, this can be until either enough locks succeed to guarantee the maximum amount of the performance resource needed is available, or enough locks fail guaranteeing that the minimum amount is not available.

Figure 3:
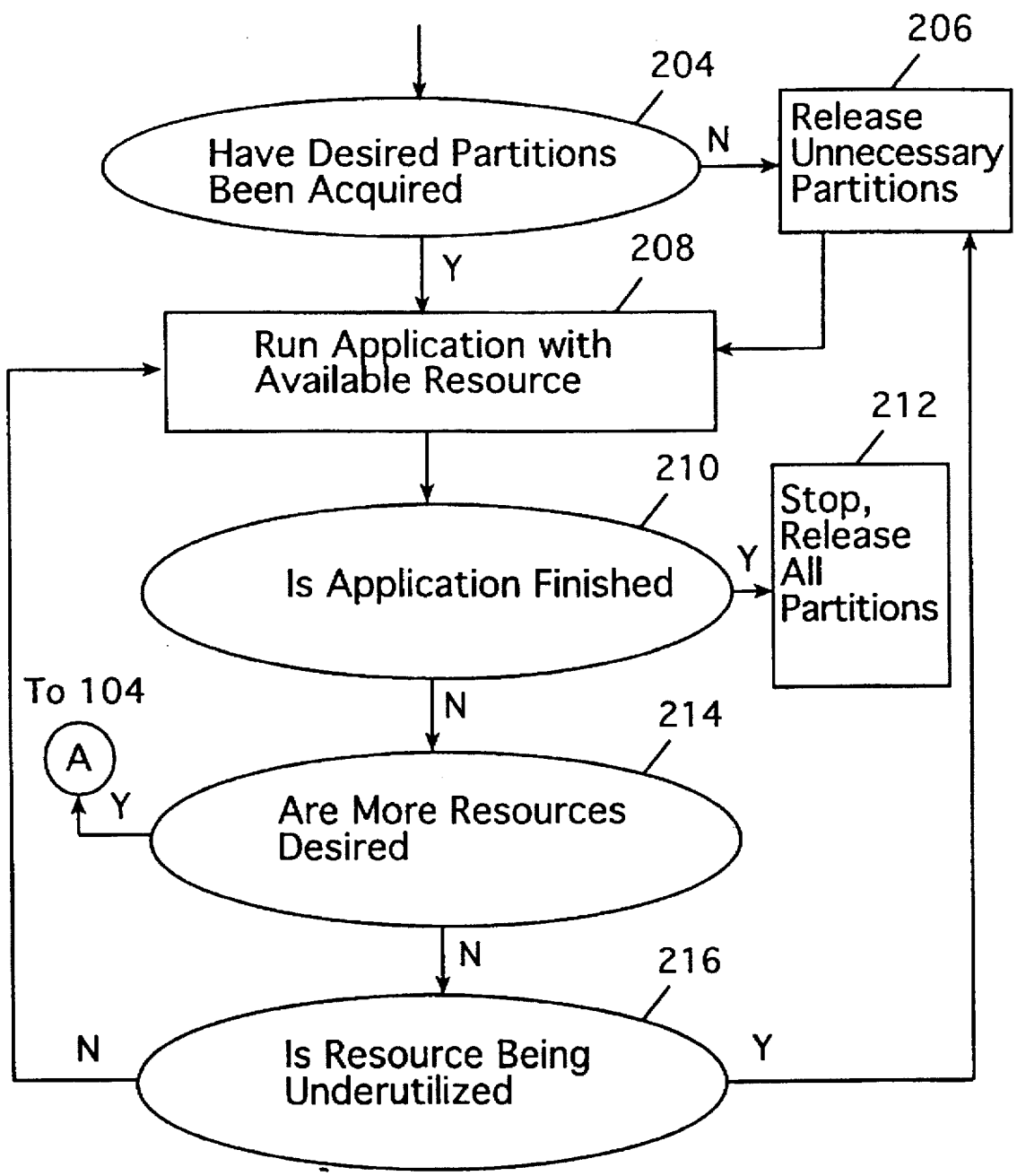
FIG. 3 is a flow chart of the operation of the dynamic processing portion of the performance resource manager system of FIG. 2.

At this point, step 114 is performed which comprises the dynamic management of the performance resource. The dynamic management step 114 includes a plurality of sub-steps as shown in FIG. 3. There may be a time that the application program decides it doesn't need some or all of the performance resource represented by the partition names to which the application holds locks or the application may need to use more of the performance resource. Therefore, step 114 is a dynamic process in which a constant monitoring of the performance resource takes place to ensure its effective utilization.

Referring now to FIG. 3 what is shown is a flow chart of the utilization (step 114) of the performance resource.

First, a determination is made whether the desired partitions have been acquired, via step 204. If the answer is no, the unnecessary partitions are released, via step 206, and the application is then run with any previously acquired performance resource, via step 208. If the desired number of partitions have been acquired (step 204), the application is then run with the available performance resource, via step 208.

Thereafter, a determination is made whether the application is finished, via step 210. If the application is finished, then the performance management system is stopped and all partitions are released, via step 212. If the application is not finished, then it is determined whether the application desires more of the performance resource, via step 214. If the answer is yes, then return to step 104 of FIG. 2. (Decide how much of the performance resource is available). If the application doesn't require more of the performance resource, then a determination is made whether a performance resource is being underutilized via step 216.

If the performance resource is not underutilized, then return to step 208 and continue running the application with the available performance resource. If the performance resource is being underutilized then return to step 206 and release unnecessary partitions and continue with the application.

If the performance resource use from applications whose programs do not subscribe to this protocol does not change significantly from one moment to the next, a system in accordance with the present invention guarantees the performance resource gets utilized as much as possible, and without risk of overallocation.

EXAMPLE USE

External Sorting and Expanded Storage

A significant use of the invention is in managing expanded storage by multiple concurrent external sorting applications on large IBM computers running the MVS operating system, as discussed earlier. As has been before mentioned, MVS provides a service, called STGTEST, that gives an instantaneous snapshot of the use of expanded storage. At any point in time, STGTEST reports two numbers of interest:

(a) Free expanded storage:

Free expanded storage is the amount of expanded storage not currently in use by the operating system or any application. Any new data written by an application to expanded storage will be stored in free expanded storage, if there is any. Using free expanded storage causes no paging activity on the system.

(b) Available expanded storage:

Available expanded storage is the amount of expanded storage that has not been used for a significant period of time. In fact, the expanded storage has gone unused long enough that MVS would migrate existing data on such storage to auxiliary storage if an application wanted to write new data to expanded storage and there was no more free expanded storage. Using available expanded storage may cause some paging activity on the system, while data is being migrated to auxiliary storage.

External sorting applications can use the STGTEST values to decide how much of their strings to store in expanded storage (via hiperspaces). The amount of available expanded storage can be divided into equal sized partitions, with a name assigned to each partition, say SORT1, SORT2, . . . , SORTn. ENQs can be issued against each of these names, starting with SORTn and working down to SORT1, until either:

(a) Enough ENQ attempts succeed to meet the estimated expanded storage needs of the sorting application, or (b) Enough ENQ attempts fail to guarantee that the minimum amount of expanded storage needed to benefit the sorting application cannot be ENQed.

Since the moment a hiperspace sorting application begins, STGEST starts reporting smaller and smaller numbers, it is important for the sorting applications to ENQ starting with the higher numbered names first. That will maximize the use of available expanded storage, while still not risking an overcommitment of expanded storage on account of sorting applications.

As the sorting application reads back its hiperspace string data for the last time, it can release that portion of expanded storage holding the data to the system. Furthermore, as each partition's worth of expanded storage is released, the application can DEQ one of the names it ENQed. The names should be DEQed in the opposite order of how they were ENQed. A stack should be used so that the last name ENQed becomes the first name DEQed. This maximizes the number of low-numbered names available, which maximizes the use of available expanded storage by sorting applications, while still preventing overallocation of expanded storage by sorting applications.

In the present invention, a method and system is described by which programs can have their applications dynamically manage their use of performance resources in a multiprogramming environment is described. The essence of this method is that by using a common operating system, the lock, individual application programs can break up a performance resource into logical partitions and then assign these partitions to different applications in such a way that the performance resource gets fully utilized, but not overcommitted. In this way, application and system performance is optimized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for utilizing a performance resource by a plurality of applications in a computer based system, the plurality of applications operating in accordance with the same protocol, the method comprising the steps of:
   (a) determining how much of the performance resource is available for a particular application;
   (b) dividing the available performance resource into partitions;
   (c) assigning each of the partitions a unique identifier;
   (d) determining which partitions of the available performance resource can be utilized by the particular application;
   (e) issuing locks on the desired partitions; and
   (f) dynamically managing the partitions by:
      (f1) determining if the desired partitions can be obtained;
      (f2) if the desired partitions cannot be obtained, releasing any unnecessary partitions that were obtained; and
      (f3) running the application with any available performance resource that was obtained.

2. The method of claim 1 in which the dynamically managing step (f) further comprises the steps of:
   (f4) determining if the application is completed; if the application is completed then stop and release all held locks; if the application is not completed then;
   (f5) determining if more of the performance resource is desired; if more of the performance resource is desired then return to the performance resource determining step (a).

3. The method of claim 2 in which the dynamically managing step (f) further comprises the steps of:
   if more of the performance resource is not desired;
      (f6) determining if the performance resource is underutilized; if the performance resource is not underutilized, return to the application running step (f3);
   if the performance resource is being underutilized, then return to the releasing step (f2).

4. A method for utilizing a performance resource by a plurality of applications in a computer based system, the plurality of applications operating in accordance with the same protocol, the method comprising the steps of:
   (a) determining how much of the performance resource, in which the performance resource comprises expanded storage, is available for a particular application;
   (b) dividing the available performance resource into partitions into substantially uniform and fixed sizes;
   (c) assigning each of the partitions a unique identifier;
   (d) determining which partitions of the available performance resource can be utilized by the particular application;
   (e) issuing locks on the desired partitions; and
   (f) dynamically managing the partitions.

5. The method of claim 4 in which the assigning step (c) further comprises the step of (c1) determining a minimum and maximum amount of the performance resource that can be utilized.

6. The method of claim 4 in which the expanded storage is divided into substantially equally sized partitions with an identifier assigned to each partition, wherein locks are issued against each partition identifier beginning with a last partition and ending with a first partition until one of the following events occurs: (1) all the identifiers are utilized, (2) the number of successful locks meets an estimated maximum need for an amount of expanded storage, or (3) the number of unsuccessful locks guarantees that the estimated minimum amount of the expanded storage needed cannot be obtained.

7. A system for utilizing a performance resource by a plurality of applications in a computer based system, the plurality of applications operating in accordance with the same protocol, the system comprising:
   means for determining how much of the performance resource is available for a particular application;
   means responsive to the performance resource determining means for dividing the available performance resource into partitions;
   means responsive to the dividing means for assigning each of the partitions a unique identifier;
   means responsive to the assigning means for determining which partitions of the available performance resource can be utilized by the particular application program;
   means responsive to the partitions determining means for issuing locks on the desired partitions; and
   means responsive to the issuing means for dynamically managing the partitions comprising
      means for determining if the desired partitions can be obtained;
      means responsive to the desired partitions determining means for releasing any unnecessary partitions that were obtained; and
      means responsive to the desired partition determining means and the releasing means for running the application with any available performance resource that was obtained.

8. The system of claim 7 in which the dynamic managing means further comprises:
   means for determining if the application is completed and means for releasing all partitions if the application is completed;
   means responsive to the application complete means for determining if more of the performance resource is desired; and
   means for acquiring more partitions if more of the performance resource is desired.

9. The system of claim 8 in which the dynamic managing means further comprises:
   means for determining if the performance resource is underutilized, and releasing the unnecessary partitions if performance resource is underutilized.

10. A system for utilizing a performance resource by a plurality of applications in a computer based system, the plurality of applications operating in accordance with the same protocol, the system comprising:
   means for determining how much of the performance resource, in which the performance resource comprises expanded storage, is available for a particular application;
   means responsive to the performance resource determining means for dividing the available performance resource into partitions of substantially uniform and fixed sizes;

means responsive to the dividing means for assigning each of the partitions a unique identifier;

means responsive to the assigning means for determining which partitions of the available performance resource can be utilized by the particular application program;

means responsive to the partitions determining means for issuing locks on the desired partitions; and means responsive to the issuing means for dynamically managing the partitions.

11. The system of claim 10, in which the assigning means further comprises means for determining a minimum and maximum amount of the performance resource that can be utilized.

12. The system of claim 11 in which the expanded storage is divided into substantially equally sized partitions with an identifier assigned to each partition, wherein locks are issued against each partition identifier beginning with a last partition and ending with a first partition until one of the following events occurs: (1) all the identifiers are utilized, (2) the number of successful locks meets an estimated maximum need for an amount of expanded storage, or (3) the number of unsuccessful locks guarantees that the estimated minimum amount of the expanded storage needed cannot be obtained.

13. A method for utilizing expanded storage by a plurality of applications in a computer based system, the plurality of applications operating in accordance with the same protocol, the method comprising the steps of:

(a) determining how much of the expanded storage is available for a particular application;

(b) dividing the available portion of the expanded storage into partitions, each of the plurality of partitions being of substantially equal size;

(c) assigning to each of the partitions a particular name;

(d) determining how many partitions of the available performance resource can be utilized by the particular application;

(e) issuing locks against the desired number of the plurality of partitions; and (f) dynamically managing the plurality of partitions by:

(f1) determining if the desired partitions can be obtained;

(f2) if the desired partitions cannot be obtained, releasing any unnecessary partitions that were obtained; and (f3) running the application with any available expanded storage that was obtained.

14. The method of claim 13 in which the dynamically managing step (f) further comprises the steps of:

(f4) determining if the application is completed; if the application is completed then stop and release all held locks; if the application is not completed then;

(f5) determining if more of the expanded storage is desired; if more of the expanded storage is desired then return to the expanded storage determining step (a).

15. The method of claim 14 in which the dynamically managing step (f) further comprises the steps of:

if more of the expanded storage is not desired;

(f6) determining if the expanded storage is underutilized; if the expanded storage is not underutilized, return to the application running step (f3);

if the expanded storage is being underutilized, then return to the releasing step (f2).

16. A method for dynamically managing a performance resource when utilized by a plurality of applications in a computer based system, the performance resource being divided into partitions; the plurality of applications operating in accordance with the same protocol, the method comprising the steps of:

(a) issuing locks on the desired partitions;

(b) determining if the desired partitions can be obtained;

(c) if the desired partitions cannot be obtained, releasing any unnecessary partitions that were obtained; and (d) running the application with any available performance resource that was obtained.

17. The method of claim 16 in which desired partition determining step (b) further comprises the steps of:

(b1) determining if the applications is completed; if the application is completed then stop and release all held locks; if the application is not completed then; and (b2) determining if more of the performance resource is desired.

18. The method of claim 17 in which desired partition determining step (b2) further comprises the steps of:

if more of the performance resource is not desired;

(b3) determining if the performance resource is underutilized; if the performance resource is not underutilized, running the application, if the performance resource is being underutilized, then release the unnecessary partitions and continue running the application.

19. A computer readable medium containing program instructions for utilizing a performance resource by a plurality of applications operating in accordance with a same protocol in a computer-based system, the program instructions comprising:

determining an available amount of the performance resource for a particular application program;

dividing the available amount into partitions;

assigning a unique identifier to each partition;

determining which partition can be utilized by the particular application program; and dynamically managing the partitions by determining if the desired partitions can be obtained, if the desired partitions cannot be obtained, releasing any unnecessary partitions that were obtained, and running the application with any available performance resource that was obtained.

\* \* \* \* \*